United States Patent
Loebig et al.

(10) Patent No.: US 10,345,587 B1
(45) Date of Patent: *Jul. 9, 2019

(54) TECHNIQUE FOR SELECTIVELY PROJECTING DIFFERENT HOLOGRAMS USING A SINGLE HOLOGRAPHIC OPTICAL ELEMENT

(71) Applicant: HEL Technologies, LLC, Clawson, MI (US)

(72) Inventors: Dean Loebig, Howell, MI (US); Dennis Finnegan, Pinckney, MI (US)

(73) Assignee: HEL Technologies, LLC, Clawson, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,264

(22) Filed: Jul. 11, 2018

Related U.S. Application Data

(63) Continuation of application No. 16/012,249, filed on Jun. 19, 2018.

(51) Int. Cl.
| | |
|---|---|
| G02B 5/32 | (2006.01) |
| F41G 1/00 | (2006.01) |
| G02B 27/01 | (2006.01) |
| G01J 1/04 | (2006.01) |
| F41G 1/30 | (2006.01) |
| G03H 1/00 | (2006.01) |

(52) U.S. Cl.
CPC ........... G02B 27/0103 (2013.01); F41G 1/30 (2013.01); G01J 1/0411 (2013.01); G02B 5/32 (2013.01); G02B 27/0189 (2013.01); G03H 1/0005 (2013.01)

(58) Field of Classification Search
CPC ... F41G 1/30; F41G 1/345; F41G 1/00; G02B 5/32; G02B 23/10
USPC .... 42/111–116; 359/1, 15, 340, 13, 19, 424, 359/398
See application file for complete search history.

(56) References Cited

U.S. PATENT DOCUMENTS

| | | | |
|---|---|---|---|
| 3,915,548 A | 10/1975 | Opittek et al. | |
| 5,483,362 A | 1/1996 | Tai et al. | |
| 5,815,936 A | 10/1998 | Sieczka et al. | |
| 5,901,452 A | 5/1999 | Clarkson | |
| 6,490,060 B1 | 12/2002 | Tai et al. | |
| 9,835,412 B1 * | 12/2017 | Finnegan | F41G 1/30 |
| 10,180,305 B2 * | 1/2019 | Finnegan | F41G 1/30 |
| 2006/0162226 A1 | 7/2006 | Tai | |
| 2011/0228366 A1 | 9/2011 | Liu | |
| 2013/0333266 A1 | 12/2013 | Gose et al. | |
| 2015/0267997 A1 | 9/2015 | Collin et al. | |

(Continued)

*Primary Examiner* — Michael D David
(74) *Attorney, Agent, or Firm* — Warner Norcross + Judd LLP

(57) ABSTRACT

A holographic sporting/combat optic may be mounted to weapon. The sporting/combat optic includes a holographic optical element that projects a composite reticle image having at least two reticle elements. The first reticle element projects into the optical viewing window in response to light having a first wavelength; whereas, the second reticle element projects into the optical viewing window in response to light having a second wavelength which differs from the first wavelength. By selectively turning on and off different light sources, the reticle elements can be selectively projected into the optical viewing window of the sporting/combat optic.

20 Claims, 5 Drawing Sheets

(56) References Cited

U.S. PATENT DOCUMENTS

2015/0362651 A1 12/2015 Voloschenko et al.
2016/0377377 A1 12/2016 Collin

* cited by examiner

TECHNIQUE FOR SELECTIVELY PROJECTING DIFFERENT HOLOGRAMS USING A SINGLE HOLOGRAPHIC OPTICAL ELEMENT

CROSS-REFERENCE TO RELATED APPLICATIONS

This application is a continuation of U.S. patent application Ser. No. 16/012,249 filed on Jun. 19, 2018. The entire disclosure of the above application is incorporated herein by reference.

FIELD

The present disclosure relates to techniques for selectively projecting different holograms using a single holographic optical element.

BACKGROUND

Holographic sporting/combat optic is a non-magnifying weapon sight that allows the user looking through an optical viewing window to see a reticle superimposed at a specific distance in the field of view. The reticle is a three-dimensional holographic image recorded on a holographic recording medium. The reticle is formed when a light beam is projected through the holographic recording medium.

Special forces soldiers, at times, use different types of ammunition on a single mission. An example of this would be a standard ammunition round used for general purpose verse a subsonic round used for stealth (quiet) purpose. A solider may encounter the need to switch between these two types of ammunition on a single mission and usually in a rapid fashion. The two types of ammunition have different ballistics associated with them. It is a benefit to the solider to be able to rapidly switch their optic between the two different ammunition types yet maintain their point of impact (zero). This is merely one example of a scenario that would benefit from projecting different holograms in a sporting/combat optic.

Therefore, it is desirable to provide a holographic sporting/combat optic that enables that enable soldiers and other weapon operators to selectively project different holograms for different scenarios, such as different ammunition types.

This section provides background information related to the present disclosure which is not necessarily prior art.

SUMMARY

This section provides a general summary of the disclosure, and is not a comprehensive disclosure of its full scope or all of its features.

In one aspect, a holographic sporting/combat optic is presented for use with a weapon. A housing for the optic defines an optical viewing window along a line of sight axis and is configured to mount to a weapon. A light source is arranged in the housing and emits a beam of light at a one (first) wavelength. A second light source (or same light source) is arranged in the housing and emits a beam of light at a second wavelength which differs from the first wavelength. A holographic optical element is disposed in the housing and operates to project a composite reticle image in the optical viewing window. The composite reticle image is comprised of at least a first reticle element and a second reticle element recorded on the holographic optical element, such that the first reticle element projects into the optical viewing window in response to light having the first wavelength and the second reticle element projects into the optical viewing window in response to light having the second wavelength. One or more light guides may be arranged in the housing. The light guides are configured to receive light from the first light source and the second light source and direct the light from the first light source and the second light source onto the holographic optical element.

A controller may be interfaced with the first light source and the second light source. The controller operates to selectively activate the first light source and the second light source. For example, the first light source emits a beam of light while the second light source is turned off and vice versa. Alternatively, both lights sources emit a beam of light. In any case, the light sources may be activated via a user input (e.g., a switch).

In one embodiment, the light guides includes a first dicroic mirror arranged to receive the light from the first light source and direct the light from the first light source towards the holographic optical element, as well as a second dicroic mirror arranged to receive light from the first dicroic mirror and the second light source and direct the light towards the holographic optical element.

In some embodiments, the first reticle element is the same color as the second reticle element. In other embodiments, the first reticle element has a different color than the second reticle element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
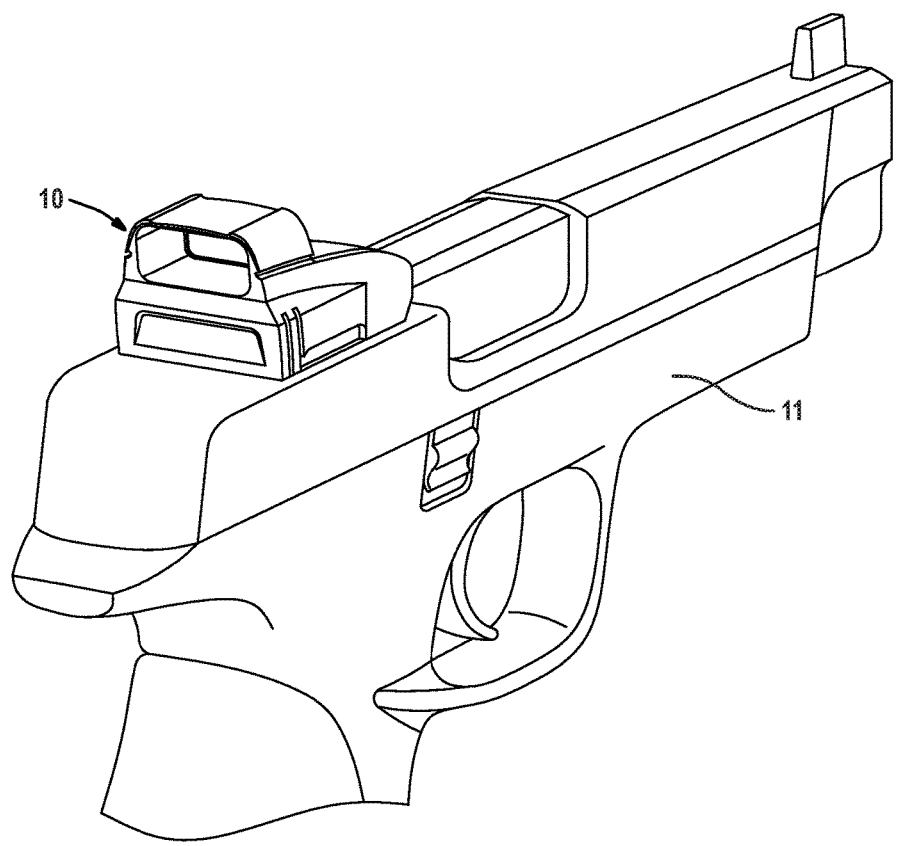
FIG. 1 is a diagram of a holographic sporting/combat optic mounted on a weapon.
Figure 2:
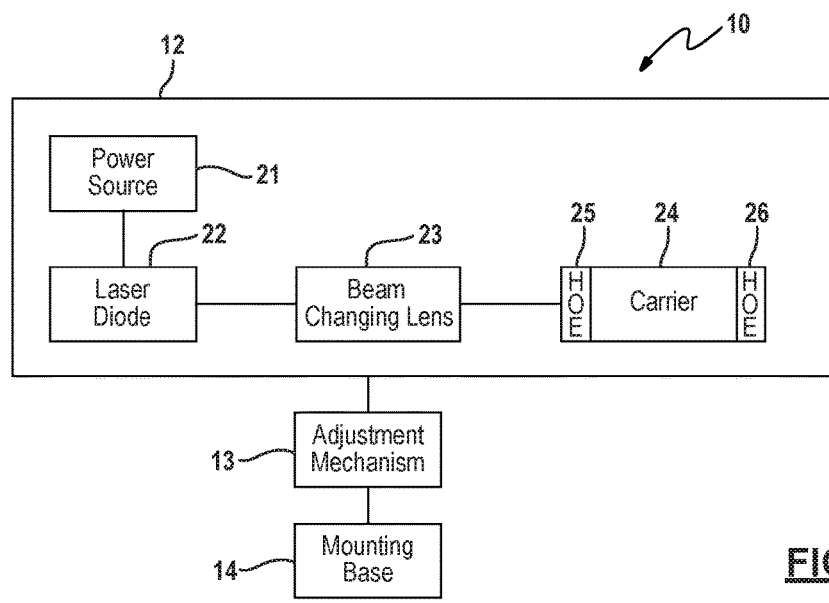
FIG. 2 is a block diagram depicting the core components which comprise the holographic sporting/combat optic.

Referring to FIGS. 1 and 2, a holographic sporting/combat optic 10 is shown mounted to a weapon 11. The holographic sporting/combat optic 10 allows a user to look through an optical viewing window 8 and projects a reticle image into the field of view as seen through the optical viewing window. A housing 12 of the holographic sporting/combat optic 10 defines an interior chamber for housing optical components therein. A mounting base 14 is provided on the bottom of the housing 12 and functions to attach the holographic sporting/combat optic 10 to the weapon 11. Various types of attachment methods may be employed depending upon the type of weapon. While the weapon is shown as a handgun, it is readily understood that the holographic sporting/combat optic 10 may be suitable for use with other types of weapons, including a rifle, a bow, etc.

Within the housing 12, the holographic sporting/combat optic 10 includes a light source (e.g., a laser diode 22), a beam changing lens (cylinder or the like) 23 and a carrier 24. The light source 22 is powered by a power source 21, such as a battery, and operates to emit a beam of light. The beam changing lens 23 receives the beam of light from the laser diode 22 and transforms the beam of light into a line. A carrier 24 is disposed in the optical viewing window and configured to receive the line of light from the beam changing lens 23. In one embodiment, the carrier 24 is comprised of a unitary transparent material (e.g., glass). The carrier 24 further defines two opposing planar surfaces through which the light passes. An incoming holographic optical element 25 is disposed adjacent to one of the opposing planar surfaces of the carrier and operates to collimate light incident thereon. An outgoing holographic optical element 26 is disposed adjacent to the other opposing planar surface of the carrier 24. In response to light incident thereon, the outgoing holographic optical element 26 operates to project a reticle image in the optical viewing window. In this embodiment, the incident light was collimated by the incoming holographic optical element 25 and passed through the carrier 24 before reaching the outgoing holographic optical element 26. In some embodiments, one or more light guides are arranged in the housing. The one or more light guides are configured receive light from the beam changing lens 23 and guide the light towards the incoming holographic optical element as further described below. In some embodiments, more than one holographic optical element can be used.

An adjustment mechanism 13 is interfaced between the housing 12 and the mounting base 14. The adjustment mechanism 13 enables the user to move the housing 12 relative to the mounting base 14. More specifically, the adjustment mechanism 13 includes a subassembly for adjusting elevational angle of the housing and another subassembly for adjusting azimuth angle of the housing. Different types of mechanical or electro-mechanical mechanisms are known in the art and may be implemented with the holographic weapons sight 10.

Figure 3:
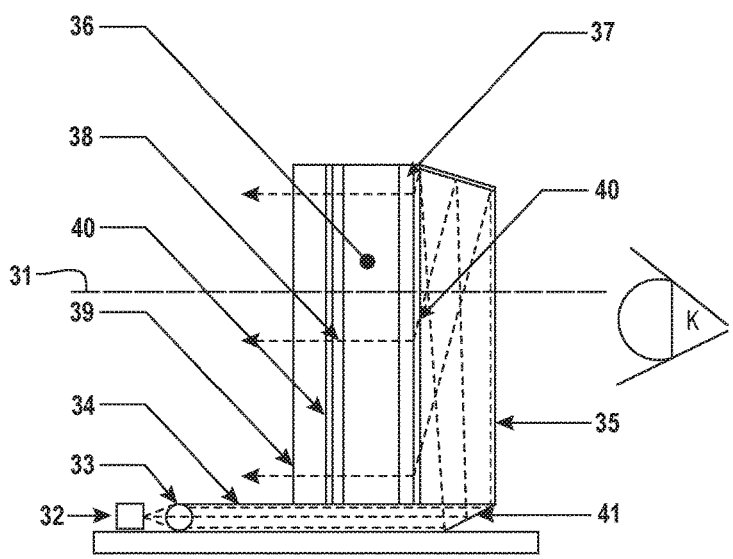
FIG. 3 is a diagram of an example embodiment of the holographic sporting/combat optic.

FIG. 3 further illustrates an example embodiment of a holographic sporting/combat optic 10 defining a line a sight axis 31 for viewing a reticle. To generate the reticle, a laser diode 32 emits a beam of light in a first direction along an axis that is parallel to the line of sight axis and towards a beam changing lens 33. The beam changing lens 33 (e.g., cylinder lens) receive the beam of light and focuses the beam of light into a line.

One or more light guides are used to direct the line of light onto the holographic optical elements. In this embodiment, a first light guide 34 receives the line of light from the beam changing lens 33 and guides the light along the same axis. The first light guide 34 includes an angled surface 41 at an end distal from the beam changing lens 33 which redirects the light in a second direction upwards at substantially ninety degrees. The angled surface 41 of the first light guide may be coated with a reflective coating, such as silver. A second light guide 35 receives the reflected light from the angled surface of the first light guide 34. The second light guide in turn directs the light in a third direction which is opposite to the first direction and towards the holographic optical elements. It is noted that this third direction is parallel with the line of sight axis 31. The first and second light guides 34, 35 may be comprised of glass or another transparent material. Although different arrangements for directing the light from the diode to the holographic optical elements are envisioned, this particular arrangement results in a compact package.

A carrier 36 is disposed in the optical viewing window along the line of sight axis. In this embodiment, the carrier 36 is a cuboid that defines two opposing planar surfaces which align with the optical viewing window. The carrier 36 is preferably comprised of a unitary transparent material, such as glass. By using a unitary carrier 36, the optical path is exposed and controlled on a lab table. This produces an optical path that is sealed and whose accuracy will not be jeopardized by the environment.

An incoming holographic optical element 37 is disposed adjacent to and/or on the planar surface facing the second light guide 35. The incoming holographic optical element 37 receives the light from the second light guide and collimates the light incident thereon. Similarly, an outgoing holographic optical element 38 is disposed adjacent to and/or on the other opposing planar surface of the carrier. In response to light incident thereon, the outgoing holographic optical element 38 operates to project a reticle image in the optical viewing window.

In the example embodiment, the incoming holographic optical element and/or the outgoing holographic optical element are implemented using an emulsion. The emulsion preferably has a grain size less than eight nanometers and maintains consistency after exposure. The incoming holographic optical element (HOE) is recorded such to allow for light (the beam) to be collimated at an angle to allow the outgoing HOE to be displayed properly to the user. The outgoing HOE contains the image reticle(s). The grain size is required to have appropriate exposable material to allow for multiple images without fading or degradation on the outgoing HOE. On the incoming HOE, it is required to set the beam angle appropriately. The consistency is required because if the emulsion were to shrink after being exposed it would cause the angle to change and thus not display the image correctly. In some instances, the emulsion may be comprised of silver halide although it is readily understood that other types of materials may be used for the emulsion.

Emulsion forming the holographic optical element are typically sealed against the surfaces of the carrier 36. For example, the incoming holographic optical element 37 is encased between the carrier 36 and an opposing surface of the second light guide 35; whereas, the outgoing holographic optical element 38 is encased by a glass cover 39. A clear adhesive 40 may be used and interposed between the glass cover 39 and the outgoing holographic optical element 38, for example adhesives commercially available from Norland Products. It is to be understood that only the relevant optical components are discussed in relation to FIG. 3, but that other components may be incorporated in the holographic sporting/combat optic 10.

Figure 4A:
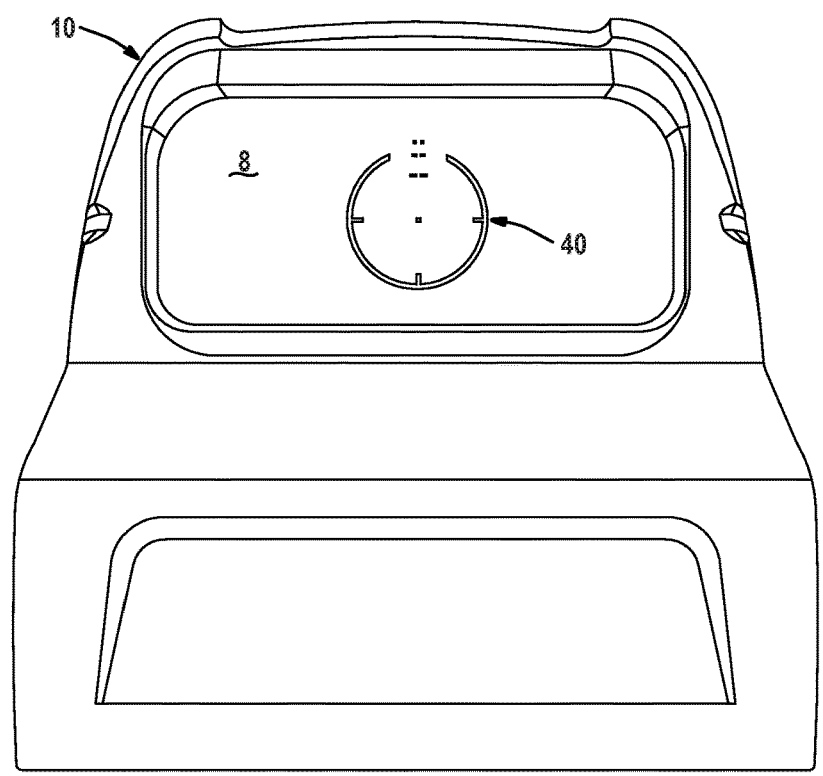
FIGS. 4A-4C are diagrams depicting an example embodiment of a reticle image produced by the holographic sporting/combat optic.
Figure 4B:
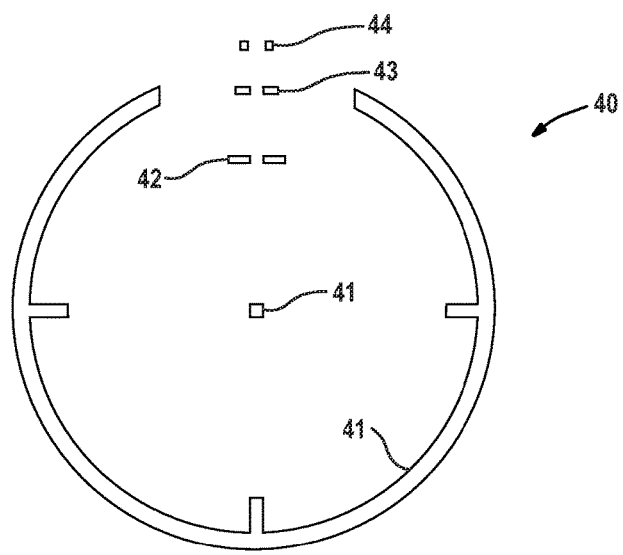
Figure 4C:
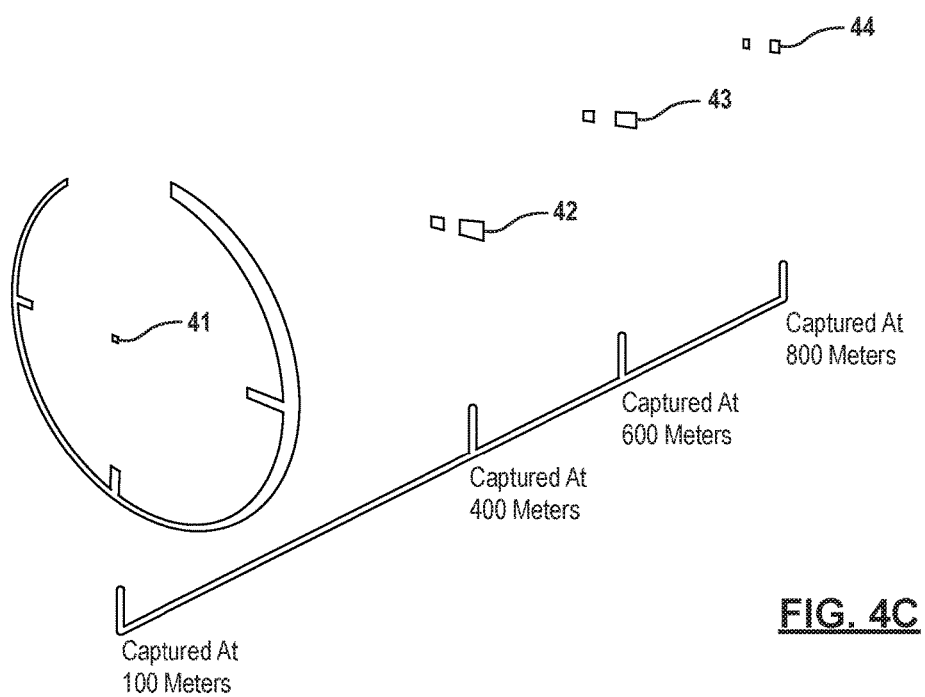

With reference to FIGS. 4A-4C, a composite reticle image 40 may be projected by the outgoing holographic optical element 38 of the holographic sporting/combat optic 10 in either a transmission or reflective hologram. In an example embodiment, the composite reticle image is comprised of two or more reticle elements. For example, the composite reticle image 40 includes a first reticle element 41, a second reticle element 42, a third reticle element 43 and fourth reticle element 44. Each reticle element preferably includes multiple markings. For example, the first reticle element 41 may be a center dot surrounded by a circle; whereas, the second reticle element 42, the third reticle element 43 and fourth reticle element 44 may be two dashes (or dots, chevrons, arrows or other geometric shape) positioned at different spacing above or below the center dot. More importantly, each of these four reticle elements is captured at a different distance from the weapon during different exposures of the holographic recording element. The reticle elements can be recorded by the outgoing holographic optical element 38 using holographic image multiplexing. In some embodiments, one or more reticle elements may be positioned above the center dot while other reticle elements are positioned below the center dot. In other embodiments, reticle elements above the center dot are reference points for one type of weapon; whereas, reticle elements below the center dot are reference points for another type of weapon. It is understood that a composite reticle image 40 can include more or less than four reticle elements.

More specifically, each reticle element (i.e., layer) is captured at whatever distance is required to align that layer with a ballistic reference point. For example, if the center reference dot's effective distance is 100 meters, the dot's layer would be captured at that distance. If the second reference dashes are accurate at 400 meters, those dashes are captured at that distance (and so on). As seen in FIG. 4C, the first reticle element 41, the second reticle element 42, the third reticle element 43 and the fourth reticle element 44 are captured at 100 meters, 400 meters, 600 meters and 800 meters, respectively. These distances are merely illustrative and may vary in different embodiments.

When the user observes the composite reticle image directly through the optic's line of sight, the user sees one reticle image 40, with various ballistic reference points that exist at their individually captured distances, thereby minimizing or eliminating parallax when aimed at targets at those distances. In other words, different parts of a single composite reticle image 40 are captured in the emulsion at different times, and each time records its particular set of ballistic data at its own specific distance (relative to the selected ballistic characteristics of a chosen weapon platform and type of ammunition). Each reference point captured in space would exhibit parallax as a real object would at that distance. Subsequently, when the user aligns the ballistic reference point with a target at the same or a similar distance, the reference point's location at the target plane would significantly reduce or eliminate the overall impact of parallax on the user's accuracy and ability to hit the target.

Figure 5:
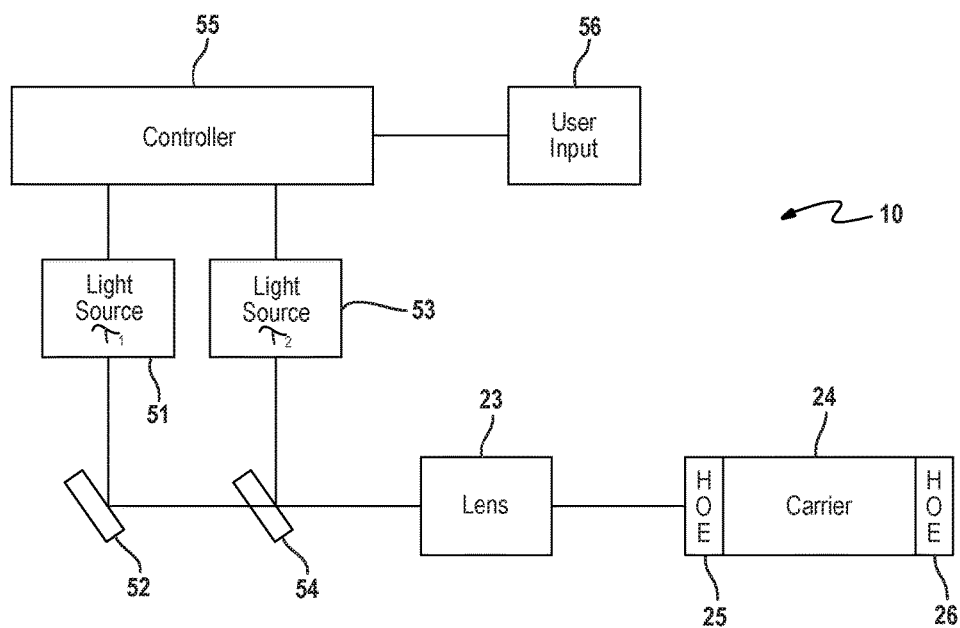
FIG. 5 is a block diagram depicting a technique for generating different reticles selectively by the holographic sporting/combat optic.

In another aspect of this disclosure, the holographic sporting/combat optic 10 may be configured to generate different reticle images using the same holographic optical element as seen in FIG. 5. This technique relies upon two or more light sources 51, 53 operating at different wavelengths. For example, a first light source 51 emits a beam of light at a first wavelength; whereas, a second light source 53 emits a beam of light at a second wavelength. The two light beams are then combined and directed towards the holographic optical element 26.

One or more optical waveguides are arranged in the housing. The optical waveguides are configured to receive light from the first light source 51 and the second light source 53 and direct the light from the first light source 51 and the second light source 53 onto the holographic optical element 26. In one example, a first dicroic mirror 52 is arranged to receive the light from the first light source 51 and direct the light from the first light source 51 through a second dicroic mirror 54 towards the holographic optical element 26; whereas, the second dicroic mirror 54 is arranged to receive light from the first dicroic mirror 52 and the second light source 53 and direct the light towards the holographic optical element 26. Other types of optical waveguides and arrangements for the optical waveguides are contemplated and fall within the broader aspects of this disclosure.

A holographic optical element is disposed in the housing of the holographic sporting/combat optic 10 and operates to project a composite reticle image in the optical viewing window. In the example embodiment, a single carrier with holographic optical elements mounted on opposing sides as described above is used in this embodiment. This technique for generating different reticle images, however, is not limited to this type of holographic optical element.

In a simplified example, the composite reticle image recorded on the holographic optical element 26 is comprised of at least a first reticle element and a second reticle element. The first reticle element projects into the optical viewing window in response to light having the first wavelength and the second reticle element projects into the optical viewing window in response to light having the second wavelength. In this way, different reticle elements can be selectively included or omitted from the composite reticle image by turning on or off light sources emitting light at different wavelengths.

Reticles are preferably designed to correspond to known ballistic reference points for a particular weapon. In the example embodiment, each reticle element in the composite reticle image corresponds to ballistic reference points for the same weapon platform. For a given weapon platform and ammunition type, a ballistic reference point may be defined as a distance from the weapon (along the line of sight axis) and an expected deviation (e.g., drop distance) by a projectile fired by the weapon from the line of sight axis at the corresponding distance. It is readily understood that the placement of the reticle elements compensate for the corresponding drop distance.

Using the technique above, a single holographic sporting/combat optic 10 can be designed to project different reticles for different scenarios. For example, a reticle for a weapon of a first type may be recorded onto the holographic optical element as well as a reticle for a weapon of a second type. The reticle for the weapon of a first type is projected into the optical viewing window in response to light having the first wavelength and the reticle for the weapon of the second type is projected into the optical viewing window in response to light having a different wavelength. By turning on and off the respective light sources, the reticle of interest can be selected. In another example, a composite reticle image is comprised of two or more reticle elements, where individual reticle elements are captured at different distances from the same weapon and can be selectively projected into the optical viewing window. In yet another example, one reticle corresponds to one type of ammunition and another reticle corresponds to a different type of ammunition but for the same weapon. These examples are merely illustrative. It is envisioned that this technique may be used to selectively introduce reticle elements that represent other types of data.

In some embodiments, the light from the two light sources have wavelengths that are different but close in length such that the color of the two reticles appear to be the same (e.g., reddish). In other embodiments, the light from the two light sources have wavelengths that are further apart from each other such that the color of the two reticles have different colors (e.g., one is red and the other is blue).

With continued reference to FIG. 5, the holographic sporting/combat optic 10 may be interfaced with a controller 55. The controller 55 selectively turns on and off the light sources to control the reticle elements projected into the composite reticle image. In an exemplary embodiment, the controller 55 is implemented as a microcontroller. It should be understood that the logic for the controller 55 can be implemented in hardware logic, software logic, or a combination of hardware and software logic. In this regard, controller 55 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that controller 55 performs a function or is configured to perform a function, it should be understood that controller 55 is configured to do so with appropriate logic (such as in software, logic devices, or a combination thereof).

In an example embodiment, a user input 56 provides the input command to the controller 55. For example, the user input 56 may be a user actuated switch. Depending on the switch position, controller 55 selectively operates the light devices. In one position, the first light source is turned on and the second light source is turned off. In a second position, the first light source is off but the second light source is turned on. In a third position, both light sources are off. In this way, the light source are selectively operable in accordance with an input from the user. It is understood that the switch can be used to support more than two light devices and different on/off combinations thereof. Moreover, it is envisioned that other types of user inputs, such as a touchscreen, may be used in place of the switch.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A holographic sporting/combat optic suitable for use with a weapon, comprising:
   a housing defining an optical viewing window along a line of sight axis and configured to mount to a weapon;
   a first light source arranged in the housing and operable to emit a beam of light at a first wavelength;
   a second light source arranged in the housing and operable to emit a beam of light at a second wavelength, where the first wavelength differs from the second wavelength;
   a holographic optical element disposed in the housing and operable to project a composite reticle image in the optical viewing window, where the composite reticle image is comprised of at least a first reticle element and a second reticle element recorded on the holographic optical element, such that the first reticle element projects into the optical viewing window in response to light having the first wavelength and the second reticle element projects into the optical viewing window in response to light having the second wavelength; and
   one or more light guides arranged in the housing, the one or more light guides configured to receive light from the first light source and the second light source and direct the light from the first light source and the second light source onto the holographic optical element.

2. The holographic sporting/combat optic of claim 1 wherein one or more light guides includes a first dicroic mirror arranged to receive the light from the first light source and direct the light from the first light source towards the holographic optical element, and a second dicroic mirror arranged to receive light from the first dicroic mirror and the second light source and direct the light towards the holographic optical element.

3. The holographic sporting/combat optic of claim 2 wherein the one or more light guides includes a collimating lens interposed between the second dicroic mirror and the holographic optical element and collimates light incident thereon.

4. The holographic sporting/combat optic of claim 1 wherein the first reticle element has a color when projected into the optical viewing window that differs from the color of the second reticle element when projected into the optical viewing window.

5. The holographic sporting/combat optic of claim 1 further comprises a user input interfaced with the first light source and the second light source, wherein the first light source and the second light source are selectively operable in accordance with an input to the user input.

6. The holographic sporting/combat optic of claim 5 wherein the first light source emits a beam of light while the second light source is turned off and vice versa.

7. The holographic sporting/combat optic of claim 5 wherein the first light source emits a beam of light while the second light source emits a beam of light.

8. The holographic sporting/combat optic of claim 1 wherein the user input is a switch integrated into the housing.

9. The holographic sporting/combat optic of claim 1 wherein each of the first reticle element and the second reticle element corresponds to a known ballistic reference point for the weapon.

10. The holographic sporting/combat optic of claim 1 wherein the first reticle element corresponds to a known ballistic reference point for a first weapon and the second reticle element corresponds to a known ballistic reference point for a second weapon that differs from the first weapon.

11. A holographic sporting/combat optic suitable for use with a weapon, comprising:
   a housing defining an optical viewing window along a line of sight axis and configured to mount to a weapon;
   a first light emitting diode arranged in the housing and operable to emit light at a first wavelength;
   a second light emitting diode arranged in the housing and operable to emit light at a second wavelength, where the first wavelength differs from the second wavelength;
   a holographic optical element disposed in the housing and operable to project a composite reticle image in the optical viewing window, where the composite reticle image is comprised of at least a first reticle element and a second reticle element, such that the first reticle element projects into the optical viewing window in response to light having the first wavelength and the second reticle element projects into the optical viewing window in response to light having the second wavelength, wherein the first and second reticle elements are recorded on the holographic optical element during different exposures of the holographic optical element;
   one or more light guides arranged in the housing, the one or more light guides configured to receive light from the first light emitting diode and the second light emitting diode and direct the light from the first light emitting diode and the second light emitting diode onto the holographic optical element; and
   a controller interfaced with the first light emitting diode and the second light emitting diode, and operates to selectively activate the first light emitting diode and the second light emitting diode.

12. The holographic sporting/combat optic of claim 11 wherein one or more light guides includes a first dicroic mirror arranged to receive the light from the first light emitting source and direct the light from the first light emitting source towards the holographic optical element, and a second dicroic mirror arranged to receive light from the first dicroic mirror and the second light emitting source and direct the light towards the holographic optical element.

13. The holographic sporting/combat optic of claim 11 wherein the first reticle element has a color when projected into the optical viewing window that differs from the color of the second reticle element when projected into the optical viewing window.

14. The holographic sporting/combat optic of claim 11 further comprises a user input interfaced with the controller, wherein the first light emitting source and the second light emitting source are selectively activated by the controller in accordance with an input to the user input.

15. The holographic sporting/combat optic of claim 14 wherein the user input is a switch integrated into the housing.

16. The holographic sporting/combat optic of claim 11 wherein each of the first reticle element and the second reticle element corresponds to a known ballistic reference point for the weapon.

17. The holographic sporting/combat optic of claim 11 wherein the first reticle element corresponds to a known ballistic reference point for a first weapon and the second reticle element corresponds to a known ballistic reference point for a second weapon that differs from the first weapon.

18. The holographic sporting/combat optic of claim 11 wherein the holographic optical element further includes
   a carrier disposed in the optical viewing window and comprised of a unitary transparent material, the carrier defines two opposing planar surfaces which align with the optical viewing window and are substantially parallel to each other;
   an incoming holographic optical element comprised of an emulsion and disposed on one of the two opposing planar surfaces of the carrier, wherein the incoming holographic optical element receives light from the beam changing lens and collimates the light; and
   an outgoing holographic optical element comprised of an emulsion and disposed on the other opposing planar surface of the carrier, wherein the outgoing holographic optical element projects the composite reticle image in the optical viewing window in response to light incident thereon.

19. The holographic sporting/combat optic of claim 18 wherein each of the first reticle element and the second reticle element corresponds to a known ballistic reference point for the weapon.

20. A weapon having the holographic sporting/combat optic of claim 11 mounted thereto.

* * * * *